United States Patent [19]

Krawczyk

[11] Patent Number: 5,799,959
[45] Date of Patent: Sep. 1, 1998

[54] HAND TRUCK BRAKE APPLICATION SYSTEM

[75] Inventor: Joseph D. Krawczyk, Pinconning, Mich.

[73] Assignee: Magline, Inc., Pinconning, Mich.

[21] Appl. No.: 706,599

[22] Filed: Sep. 5, 1996

[51] Int. Cl.$^6$ ........................................ B60T 1/00
[52] U.S. Cl. .................. 280/47.27; 188/22; 188/112; 188/29
[58] Field of Search .............. 188/19, 22, 1.12, 188/29; 280/47.131, 47.29, 47.26, 47.27, 33.444; 16/35 R

[56] References Cited

U.S. PATENT DOCUMENTS

| | | | |
|---|---|---|---|
| 1,200,792 | 10/1916 | Alexander | 188/22 |
| 1,270,024 | 6/1918 | Evenson | 188/22 |
| 2,639,785 | 5/1953 | Vickers . | |
| 2,738,034 | 3/1956 | Levine . | |
| 3,061,049 | 10/1962 | Bramley | 188/29 |
| 3,117,653 | 1/1964 | Altherr . | |
| 3,217,839 | 11/1965 | Watkins et al. . | |
| 3,276,550 | 10/1966 | Honeyman | 280/47.27 |
| 3,486,587 | 12/1969 | Malloy | 188/22 |
| 3,896,904 | 7/1975 | Walker | 280/47.27 |
| 3,968,974 | 7/1976 | Wetzel . | |
| 4,142,732 | 3/1979 | Boyd . | |
| 4,276,962 | 7/1981 | Aulik . | |
| 4,823,915 | 4/1989 | Nagano . | |
| 5,042,622 | 8/1991 | Smith et al. . | |
| 5,277,436 | 1/1994 | Frank et al. . | |
| 5,390,942 | 2/1995 | Schuster et al. . | |
| 5,393,081 | 2/1995 | Mortenson . | |
| 5,499,697 | 3/1996 | Trimble et al. | 188/29 |
| 5,524,731 | 6/1996 | Grieg | 188/22 |

FOREIGN PATENT DOCUMENTS

662537  10/1987  Switzerland ................ 188/29

Primary Examiner—J. J. Swann
Assistant Examiner—Gary Savitt
Attorney, Agent, or Firm—Reising, Ethington, Learman & McCulloch PLLC

[57] ABSTRACT

A manually propelled, two-wheel supported hand truck for use in transporting products has a frame normally supported by the wheels in generally vertical inclination and comprises connected side rail members, and a fixed frame handle surface near its upper end. The frame supports a forwardly extending, load supporting nose plate. An axle, coupled to and extending crosswisely rearwardly of the frame journals the wheels. Supports on the frame side rail members journal a laterally extending pivotal brake applying rod having spaced apart brake shoes in a first position out of brake applying engagement with the wheels but aligned therewith, the rod being pivotal to move the shoes to a second position into braking engagement with the wheels. Fixed to the brake applying rod is a lever arm connected to a generally vertically extending rigid member. A mobile brake operating handle is mounted on the frame for movement relative to the fixed frame handle surface, the brake operating handle being connected with the rigid member to move it upwardly and downwardly and pivot the brake applying rod. A safety control member is fixed on the rod and is operative to cooperate with the frame to halt brake applying movement of the brake applying rod upon further movement of the rod beyond brake applying rotation.

8 Claims, 8 Drawing Sheets

HAND TRUCK BRAKE APPLICATION SYSTEM

BACKGROUND OF THE INVENTION

This invention relates to two-wheeled hand trucks and, more particularly, to fail safe centrals for hand operated brakes. Particularly when heavily loaded hand trucks are being moved down stairs and steep ramps, it is necessary to control them with brakes which prevent them from running away and potentially injuring the operator and damaging the merchandise being transported. Brake systems for slowing or halting travel down relatively steep stairs or ramps have taken different forms and typically have been handle actuated. Applicant's assignee has, for some years, marketed hand trucks in which lever operated brakes have directly engaged the tires of the hand truck wheels to slow them or halt them, and used a rigid rod between the brake lever and a pivoted rod operated handle.

The present invention is concerned with improved hand-braked systems which can be marketed, either as attachments to fit most hand truck designs or as a part of newly manufactured hand trucks for the same purpose of controlling speed, or holding the load momentarily when moving uphill.

SUMMARY OF THE INVENTION

The invention is concerned with an improvement in a two-wheeled hand truck wherein a brake manipulating handle device is so installed that an operator grasping the hand truck handle can easily apply the brakes by relatively simply manipulating the brake applying handle. The improvement concerns a control for the brakes which operates after a predetermined pivot of the brake actuating rod to hold the brakes in braking position.

A prime object of the invention is to provide an automatically engaged and returned, simple and reliable fail safe control operating sequentially with the primary brake shoes to prevent the brake shoes from being pivoted past predesignated operative position.

Still another object of the invention is to provide an economical system which adapts to hand trucks in the field already using a rigid brake rod and brake shoe structure and which can be easily installed without any necessity for the hand truck owner to do any manufacturing and, perhaps, inadvertently deleteriously affecting the function of the brakes.

Other objects and advantages of the invention will become apparent with reference to the accompanying drawings and the accompanying descriptive matter.

THE DRAWINGS

The presently preferred embodiment of the invention is disclosed in the following description and in the accompanying drawings, wherein.

2

DETAILED DESCRIPTION

Figure 1:
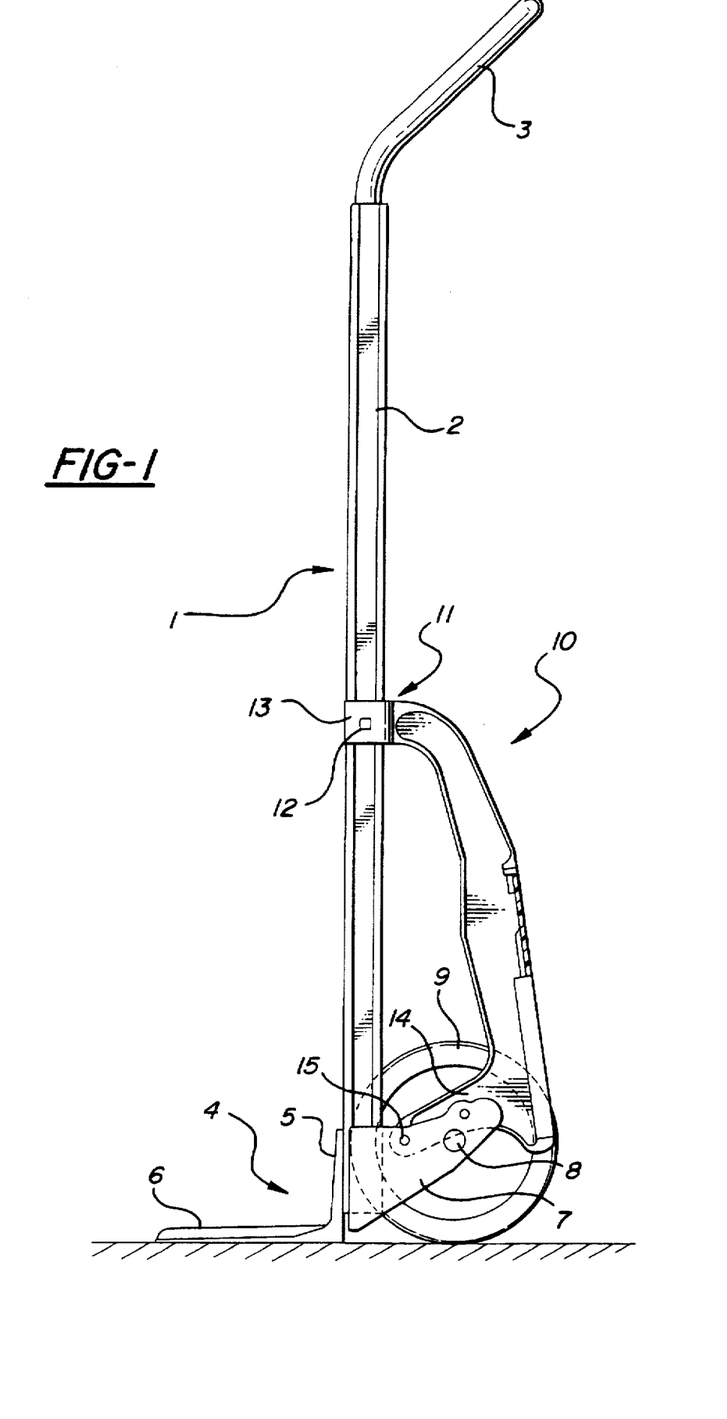
FIG. 1 is a side elevational view of a conventional hand truck with the braking system, however, omitted in the interest of simplicity.

Referring now more particularly to the accompanying drawings, and in the first instance to FIGS. 1–9 thereof, a two wheel hand truck 1 of conventional construction is shown in FIG. 1 and includes a pair of upright side rail frame members 2, joined at vertically spaced intervals by cross bars 2a. At their lower ends, the frame members 2 are spanned by a nose piece 4 having an upright flange 5 fixed to the side rail members 2 and a forwardly projecting, load-carrying nose 6. Fixed to the lower end of each frame member 2 is a rearwardly projecting bracket 7 in which is secured an axle 8. A pair of preferably inflated rubber tired wheels 9 are journalled on the axle shaft 8 in the usual manner, and fixed to the frame 1 adjacent the wheels 9 is a pair of U-shaped stair climbers 10. The upper ends 11 of the stair climber members 10 are provided with a yoke 13 secured by means of a bolt or pin 12 to the adjacent frame member 2. At the opposite end of each member 10 is an arm 14 that is fixed to the associated bracket 7 by a bolt or pin 15, or the like.

Figure 8:
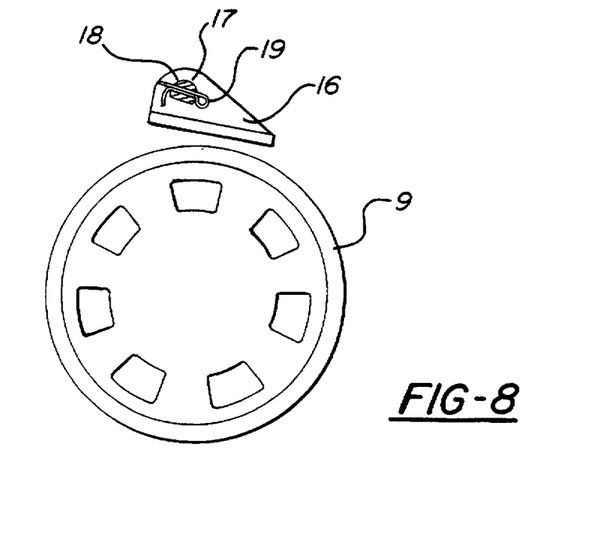
FIG. 8 is a schematic, side elevational view illustrating the manner in which the brake pads or shoes are applied to the wheels in the braking operation.

FIG. 8 illustrates the manner in which a brake pad 16 is applied to each of the wheels 9. A brake pad 16 for each wheel 9 is provided with a D-shaped opening 17 permitting it to be non-rotatably received on a D-shaped pivot rod or brake actuating rod or shaft 18. Cotter pins 19 can be provided to secure the brake pads against end-wise movement on rod 18.

Figure 2:
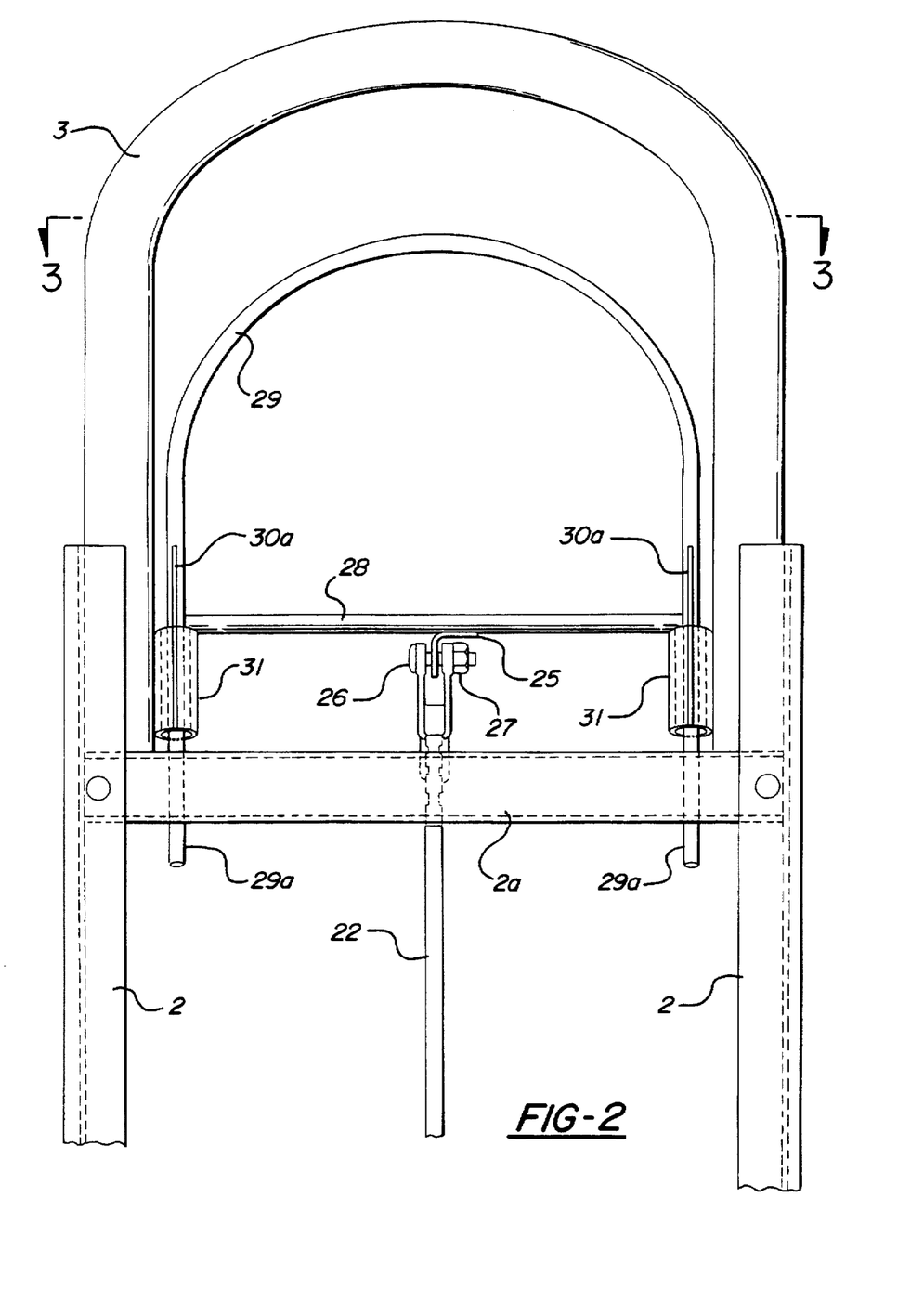
FIG. 2 is an enlarged fragmentary upper end front elevational view illustrating a U-shaped hand truck handle and the normal position of the hand operated, brake applying handle relative thereto.
Figure 3:
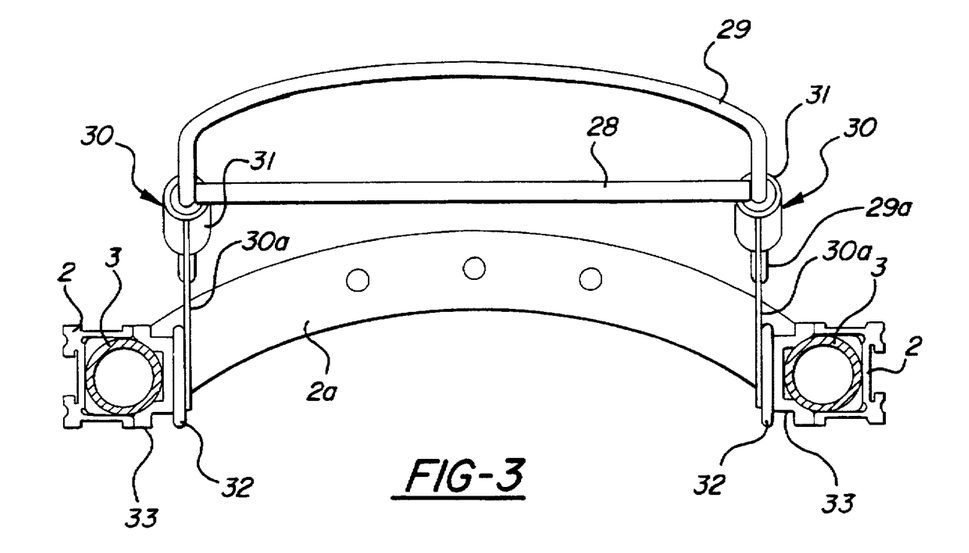
FIG. 3 is a fragmentary sectional top plan view taken on the line A—A of FIG. 2.
Figure 9:
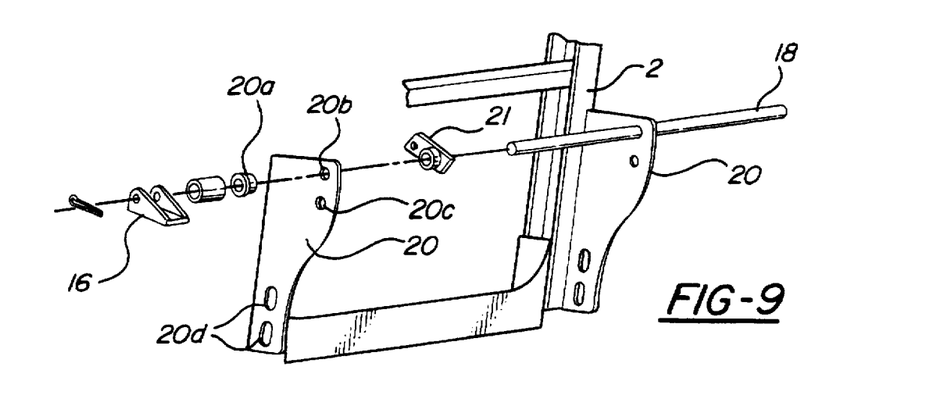
FIG. 9 is an exploded fragmentary perspective view further illustrating the brake applying assembly.

As FIG. 9 illustrates, the brake applying shaft 18, which mounts a brake pad or shoe 16 above each of the wheels 9, is rotatably supported in bearings 20a carried in openings 20b or 20c provided in brackets 20 which are fixed to the side rails 2 of the hand truck. Intermediate the ends of rotatable shaft 18 is mounted a brake applying lever or bell crank arm 21 which is operated by a generally vertically disposed brake rod, generally designated 22, which has a lower end yoke 22a and an upper end yoke 22b (see FIG. 5). At its lower end, the rigid brake rod 22 connects to the lever 21 via a suitable pin fastener such as the bolt shown at 23 and a nut 24. At its upper end the brake rod 22 secures to a bracket 25 via a similar pin fastener and nut, 26 and 27 respectively. The bracket 25 is carried by a cross-rod 28 spanning a U-shaped brake applying handle 29. It is to be observed that the brake applying handle 29 fits within the boundaries of, and is disposed proximate to, the U-shaped hand truck handle 3, which is bolted to the hand truck channels 2.

The brake rod 22, brake lever 21, shaft 18, and brake pads 16 are all conventional in applicant's presently marketed hand trucks. The brake applying handle system with the brake rod return mechanism, which is disclosed, incorporates the handle 29 in the position indicated in FIG. 2 and the cross rod 28. It is to be observed that the U-shaped hand truck handle 3, which is rigidly affixed to side rails 2, is provided with brackets 30 with vertically inclined sockets or tubes 31 which receive the free ends or rods 29a of the brake-operating handle 29. The sockets 31 are in the form of high molecular weight polyethylene sleeves to substantially frictionlessly provide slide bearings for the ends 29a. Each socket 31 has a support plate portion 30a which is connected to the adjacent side rail 2 through spacer members 32 (FIG. 3) and 33 via screw or bolt members 34 (FIG. 4) which extend all the way through the handle end 3 and the associated side rail 2, and can be secured via suitable nuts 35.

Figure 4:
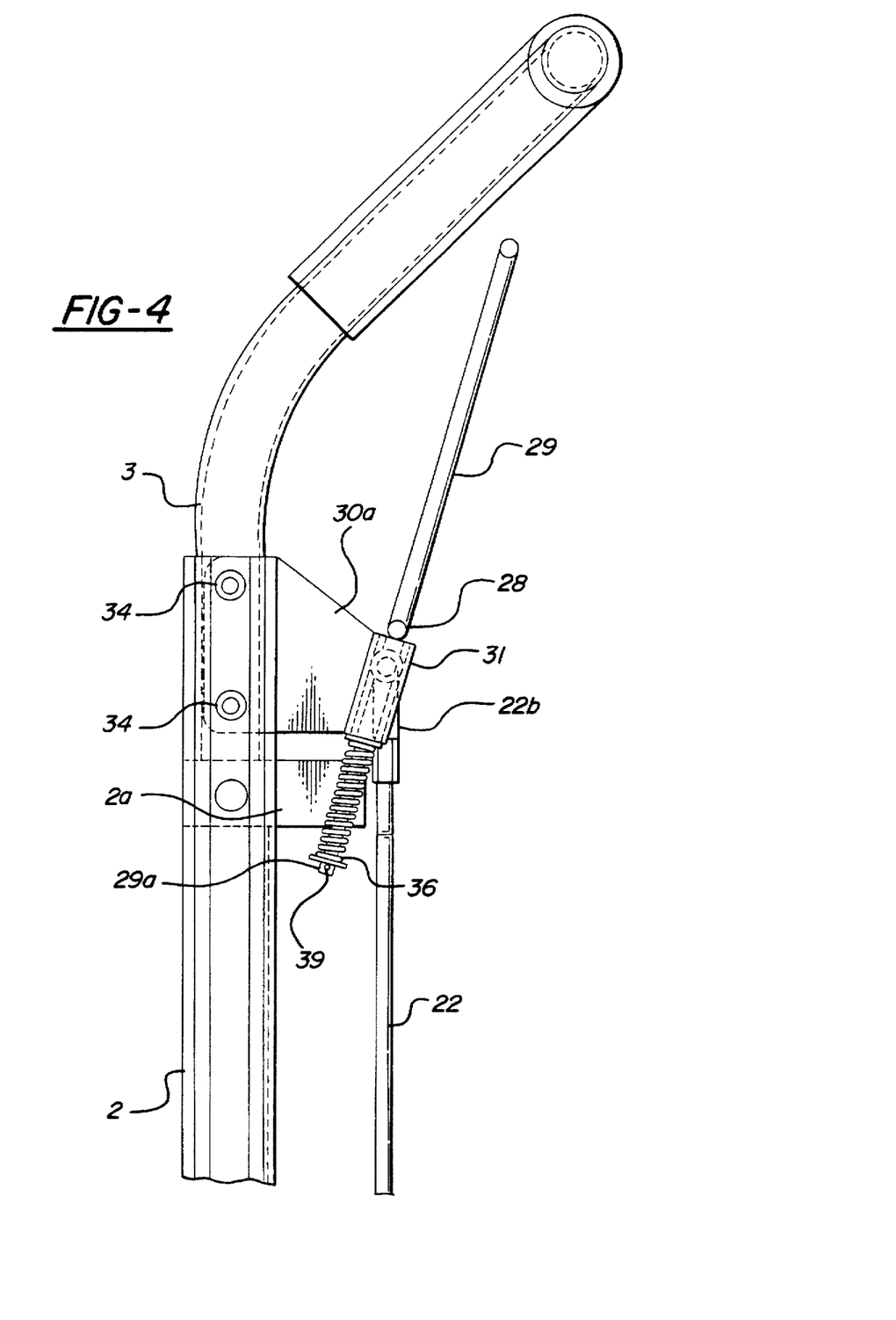
FIG. 4 is a fragmentary side elevational view of the apparatus illustrated in FIG. 2.
Figure 5:
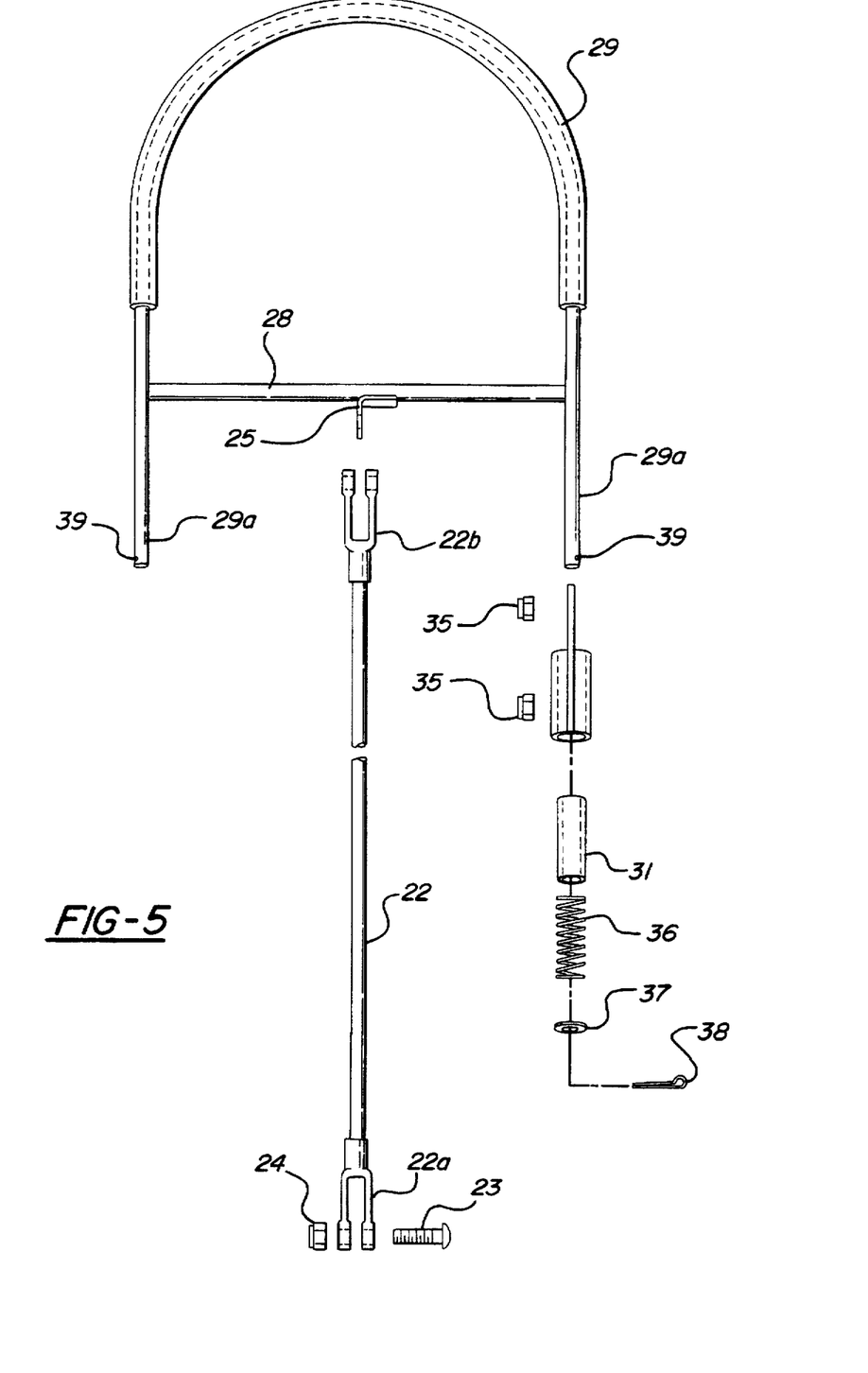
FIG. 5 is an exploded front elevational view of the brake handle and brake applying system only.
Figure 6:
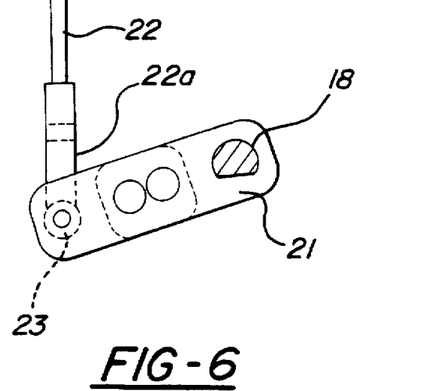
FIG. 6 is an enlarged fragmentary side elevational view of the brake applying lever.
Figure 7:
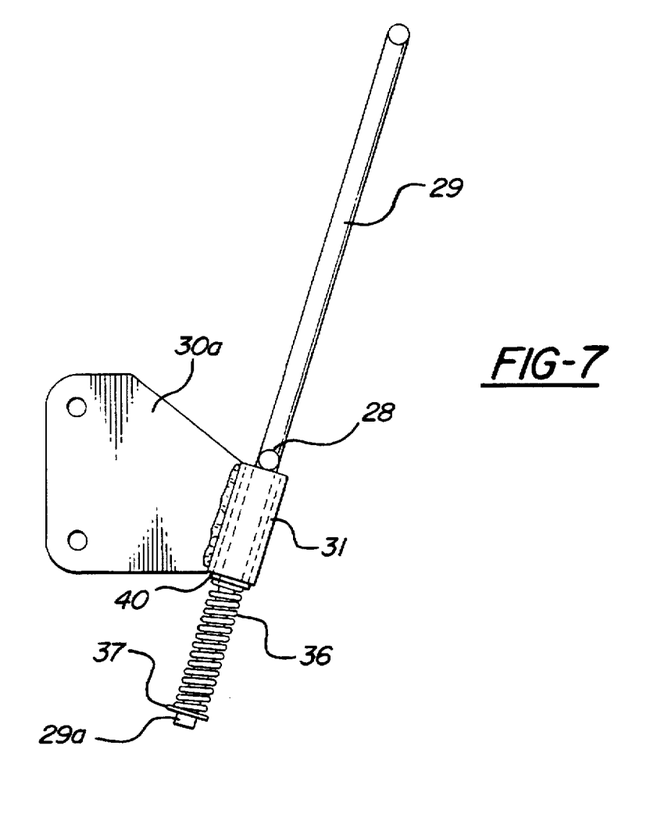
FIG. 7 is an enlarged, side elevational view on an enlarged scale, more particularly illustrating the brake handle return system.

As FIGS. 4, 5, and 7 particularly indicate, the lower ends 29a of brake applying handle 29 each receive return coil springs 36. Each spring 36 can be retained at the lower end of each rod 29a by a washer 37 retained by a cotter pin 38, which extends through an opening 39 in each rod end 29a. At its upper end, each spring 36 bears against a washer 40 which abuts the lower end of the socket 31. In the normal non-braking position of the parts, the cross rod 28 of brake actuator 29 is in the position shown in FIGS. 4 and 7 in which it abuts the upper end of sleeve socket 31. In this position there is a predetermined space or clearance between the brake shoes 16 and the wheels 9, as shown in FIG. 8.

The hand truck is operated in the usual manner, with the operator grasping the rearwardly inclined handle 3 with both hands to push the loaded hand truck along. When it is desired to operate the brake, the operator can merely extend his or her fingers to also grasp the rearwardly inclined handle 29, without releasing the grip of both hands from the handle 3. It is only necessary to pull the handle 29 upwardly a distance of approximately ⅛ to ½ an inch in order to apply the brake shoes 16 to the wheels 9 and slow or brake the progress of the hand truck. This action occurs through the braking forces applied to the vertically extending brake rod 22 which operates brake lever arm 21 to revolve the shaft 18, and thereby swings the brake shoes 16 down into braking engagement with the wheels 9. When the operator releases the handle 29, the springs 36, which have been compressed when the handle 29 is raised, operate to return the brake rod 22, lever arm 21, shaft 18 and brake shoes 16 to normal inoperative position.

Another Handle Embodiment

Figure 10:
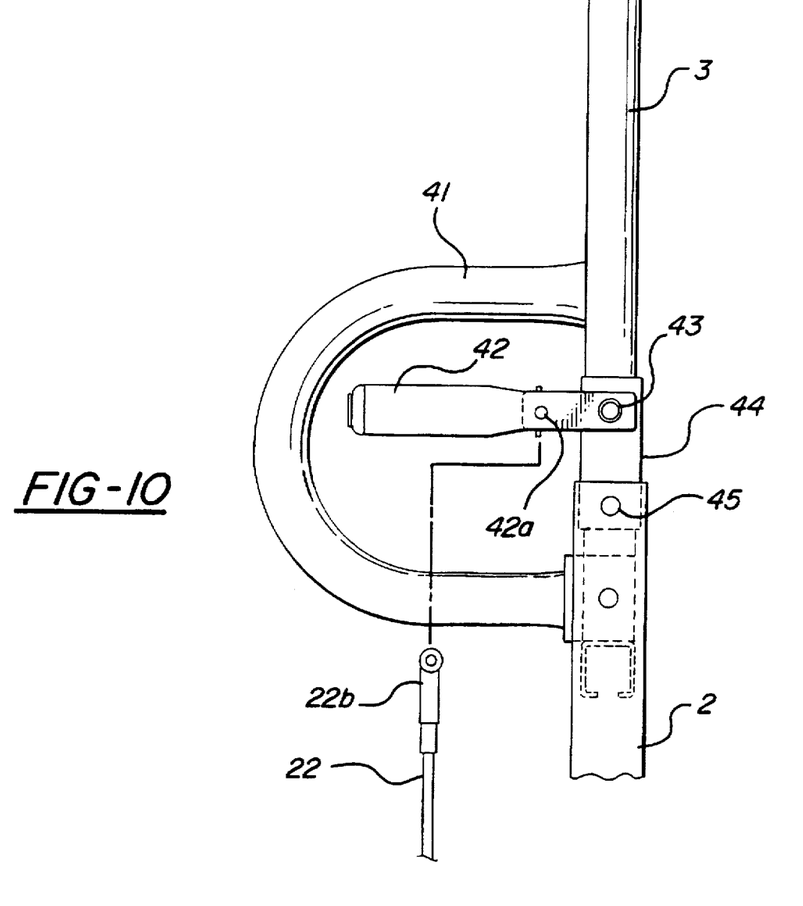
FIG. 10 is a fragmentary side elevational view illustrating another form of hand truck handle and an associated brake handle which can be used to operate the brake rod.
Figure 11:
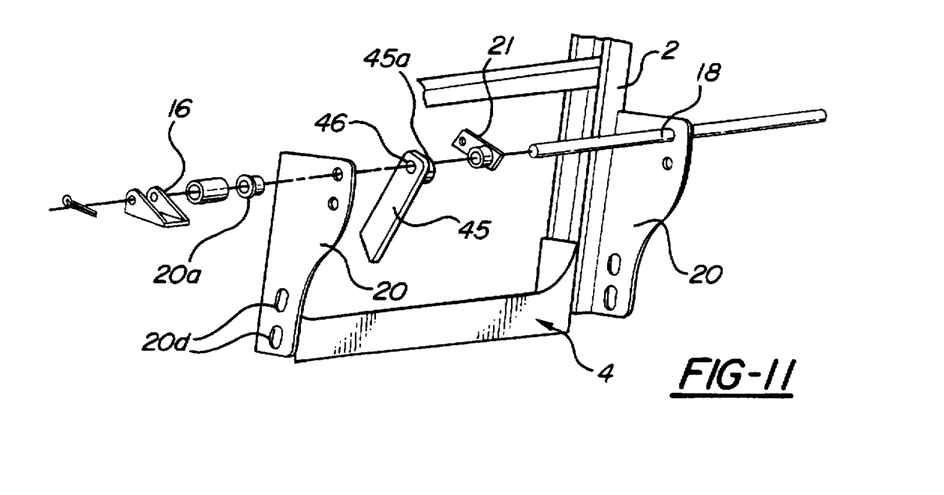
FIG. 11 is an exploded perspective view similar to FIG. 9 illustrating various elements of the braking assembly including a brake rod controlling fail safe member.

In FIG. 10, another form of hand truck handle is disclosed in which the U-shaped handle 3 is not rearwardly bent at its upper end, as in FIG. 4. Rather, a pair of side U-shaped grips or handles 41 are affixed to the lower ends of U-shaped handle 3 or to the upper ends of side rails 2. In this optional form of conventional hand truck, the braking assembly remains the same and is operated by the same rigid brake rod 22, which has a yoke-shaped upper end 22b, as previously, which attaches directly to a handle lever 42 at handle opening 42a. A handle 42 is provided within one or both of the handle grip 41 openings. At its inner end, the handle 42 is pivotally connected at 43 to a bracket assembly 44 which secures to the lower end of handle 3, as with a bolt and nut assembly 45.

In order to operate the brake shoes 16, it is merely necessary for the operator, who is gripping each of the handles 41 on each side of the hand truck, to extend his or her fingers and pull the handle or handles 42 upwardly to swing it, or them, upwardly about the pivot 43. In this installation, the handle or handles 42, when released, may be gravity or manually returned to the position shown in FIG. 10 to lift and restore the brake shoes 16 to inoperative position. Alternatively, they may be spring returned.

The Fail Safe Control Improvement

Figure 13:
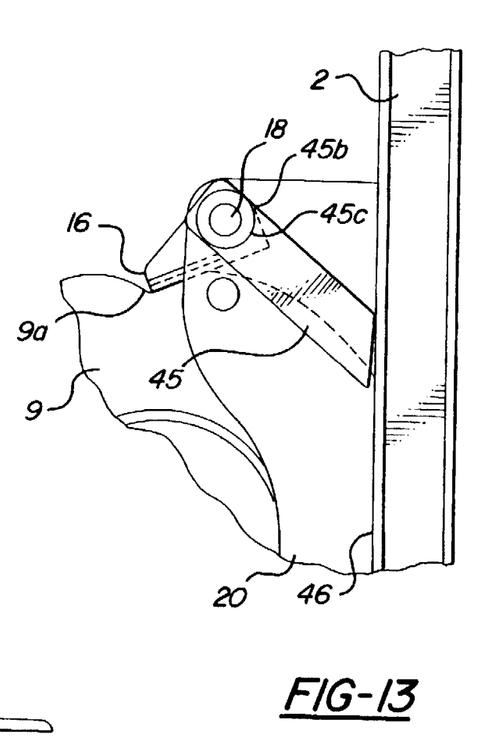
FIG. 13 is a similar enlarged fragmentary side elevational view showing the fail safe lever pivoted into engagement with rear face of the frame side rail to maintain the position of the pivoted brake shoes.

With either of the embodiments illustrated, or others of a similar nature, it is possible when relatively large in cross-section pneumatic balloon tires are employed, and the air pressure in the tires is lost to a substantial degree, to so depress the tires that the brake shoes can swing past a position in which they exert less and less, and finally no, braking friction on the tires. This is illustrated in FIG. 13 wherein one of the tires 9 is shown depressed, as at 9a, by its brake shoe 16. In this pivoted position, the brake pad 16 has swung to a predesignated position short of vertical in which the pad or shoe 16 is in an optimum braking engagement with the tire. Further or continued swinging movement would bring it out of engagement with the tire altogether. To avoid this possible problem wherein the hand truck might run away down a sloped ramp or stair surface, a brake control bar lever member or mechanism 45 is fixed to the brake actuating rod 18 in a position rearwardly opposite a conjunctive load bearing, frame-connected control surface or part 46a. This control part 46a may be the flat, central rearwardly facing surface of one of the side rails 2.

The bar 45 is shown as provided with an integrated boss or hub 45a, with the opening 46 through the hub 45a shaped to be slideably received on the brake applying rod 18. The opening through bar 45 can be circular or D-shaped. The fit in opening 46 is such that rotation of the brake actuating rod 18 positively rotates the bar 45. Set screw 45b, extending through a threaded opening 45c in the hub 45a to engage rod 18, prevents endwise movement of the bar 45 on the rod 18.

Figure 12:
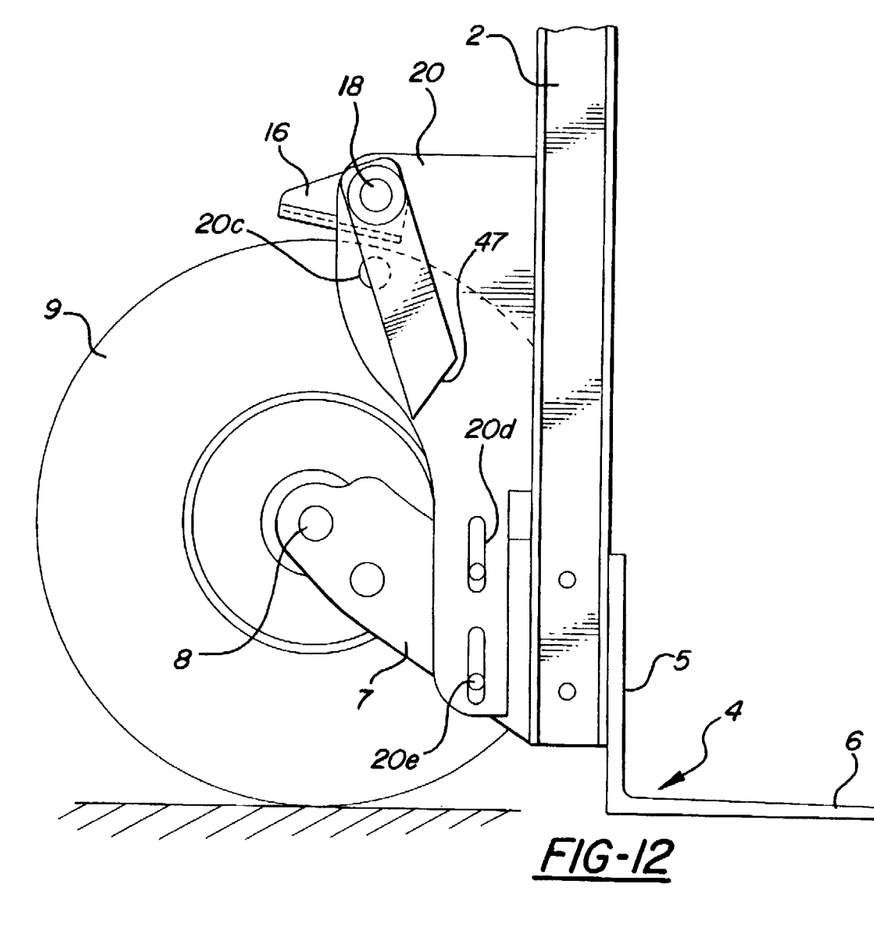
FIG. 12 is an enlarged, fragmentary, elevational view showing the fail safe lever control member in a normal or removed position with respect to the side rail with which it is aligned in a front to rear direction.

As FIG. 12 indicates, the bar 45 extends at a forwardly and downwardly extending angle generally opposite to the extension of lever arm 21 and includes a face 47 with a predetermined inclination. The rod 18 can be mounted in alternative openings 20c when small diameter wheels are employed and the position of brackets 20 can also be adjusted via the elongate openings 20d and fasteners or bolts 20e.

Upon a predetermined rotation of the bar 45 from the normal rest position shown in FIG. 12, the bar 45 is swung by the rod 18 into engagement with the control part face 46 of the side rail. It is to be understood that while the rearward facing surface of the side rail 2 serves very nicely as a control surface which limits rotation of the rod 18, another member or the like carried by the rail 2 could also provide such a control surface. The point is to provide a control surface which is rigidly supported by the frame of the hand truck as a load bearing structure to positively stop movement of the bar 45 and consequently the brake actuating rod 18. In the present embodiment, the surface 47 halts revolution of the brake actuating rod 18 at a time when the brake pad has rotated through the arc indicated in FIG. 13. At this time optimum braking pressure is being exerted by the brake pads or shoes 16.

It is to be understood that other embodiments of the invention which accomplish the same function are incorporated herein within the scope of the following patent claims.

I claim:

1. In a manually propelled hand truck for use in transporting products and including:
   a. a frame normally supported in generally vertical inclination and comprising side rail members joined by cross members and having a frame handle surface near its upper end, the frame supporting a forwardly extending, load supporting nose plate;
   b. an axle, coupled to and extending crosswisely rearwardly of said frame, having spaced apart frame supporting wheels with pneumatic tires thereon, journaled thereon; and
   c. supports on said frame side rail members journaling a laterally extending pivotal brake applying rod having brake shoes thereon supported on said rod in a first position out of brake applying engagement with said tires but aligned therewith, said rod being pivotal in one direction to move said shoes to a second position into braking engagement with said tires; the improvement wherein said frame supports a rearwardly facing brake control surface at a spaced distance above said nose plate and a safety control member is moveable with said rod with further pivoting of said rod in said one direction from a first remote position to a second operative shoe halting position engaging said brake control surface only after a predetermined pivoting of said rod and brake shoes beyond a predetermined braking engagement with said wheels.

2. The hand truck of claim 1 wherein said control surface comprises a portion of the rear face of one of said side rails.

3. The hand truck of claim 1 wherein said safety control member is fixed on said rod in front to rear alignment with said control surface and operative to cooperate with said control surface to halt brake applying movement of said brake applying rod after a predetermined pivot of said brake applying rod.

4. The hand truck of claim 2 wherein said safety control member comprises a control lever fixed on said brake applying rod to extend therefrom in a forwardly and downwardly projecting angular position in front to rear alignment with one of said side rails to cooperate with said control surface to halt brake applying movement of said brake applying rod.

5. The hand truck of claim 4 wherein said control lever has a forwardly facing free end with a surface shaped to engage said control surface upon predetermined pivoting of said brake applying rod.

6. The hand truck of claim 5 wherein said engagement takes place before said brake shoes pivot past a generally vertical position.

7. In a method of constructing a manually propelled hand truck for use in transporting products which incorporates a frame normally supported by said wheels in generally vertical inclination and comprising side rail members joined by cross members and having a frame handle surface near its upper end, the frame supporting a forwardly extending, load supporting nose plate and further supporting rearwardly facing brake control surface at a spaced distance above said nose plate; an axle, coupled to and extending crosswisely rearwardly of said frame, having a spaced apart pair of wheels with radially compressible tires thereon, journaled thereon; supports on said frame side rail members journaling a laterally extending pivotal brake applying rod having brake shoes thereon supported on said rod in a first position out of brake applying engagement with said tires but aligned therewith, said rod being pivotal to move said shoes to a second position into braking engagement with said tires: the steps of:
   a. mounting and fixing a control bar member on said rod to extend therefrom in a forwardly and downwardly angled position so as to be moveable from a first remote position to a second operative position halted by said frame only after a predetermined pivoting of said rod in one direction, with further pivoting of said rod in said same direction.

8. The method of claim 7 comprising positioning said control bar member on said rod opposite a portion of the rear face of one of said side rails.

* * * * *

UNITED STATES PATENT AND TRADEMARK OFFICE
CERTIFICATE OF CORRECTION

PATENT NO. : 5,799,959
DATED : September 1, 1998
INVENTOR(S) : Joseph D. Krawczyk It is certified that error appears in the above-indentified patent and that said Letters Patent is hereby corrected as shown below:

Column 1, line 5, change "centrals" to -- controls --;
  line 57, after "of" insert -- one form --; line 58,
  change "relative thereto" to -- which may be used with the
  brake control system --.

Column 2, line 2, change "system" to -- rod --; line 6,
  change "the" to -- a --; line 7, change "system" to
  -- mechanism --; line 12, after "assembly" insert
  -- depicted in Figures 2-8--; line 15, after "which"
  insert -- optionally --; line 25, after "with" insert
  -- the --; same line, after "of" insert -- one of --;
  same line, change "rail" to -- rails --.

Column 3, line 39, after "truck" insert -- , as described
  thus far, --.

Column 4, line 7, after "16," insert -- via the second handle
  embodiment --.

Signed and Sealed this

Twelfth Day of January, 1999

Attest:

Attesting Officer

Acting Commissioner of Patents and Trademarks